US012706510B2

(12) United States Patent
Zhang et al.

(10) Patent No.: US 12,706,510 B2
(45) Date of Patent: Aug. 11, 2026

(54) MAGNETIC LEVITATION MOTOR SEALING-COOLING APPARATUS FOR REFRIGERATION SYSTEM AND METHOD THEREFOR

(71) Applicant: SHANGHAI MARINE DIESEL ENGINE RESEARCH INSTITUTE, Shanghai (CN)

(72) Inventors: Yan Zhang, Shanghai (CN); Qiye Jin, Shanghai (CN); Jingya Feng, Shanghai (CN); Pingting Wang, Shanghai (CN); Yu Bao, Shanghai (CN); Xiaobo Li, Shanghai (CN); Yue Li, Shanghai (CN); Shien Tu, Shanghai (CN); Qingpeng Ji, Shanghai (CN); Wei Chen, Shanghai (CN)

(73) Assignee: SHANGHAI MARINE DIESEL ENGINE RESEARCH INSTITUTE, Shanghai (CN)

( * ) Notice: Subject to any disclaimer, the term of this patent is extended or adjusted under 35 U.S.C. 154(b) by 0 days.

(21) Appl. No.: 19/130,169

(22) PCT Filed: Nov. 8, 2023

(86) PCT No.: PCT/CN2023/130575

§ 371 (c)(1),
(2) Date: May 15, 2025

(87) PCT Pub. No.: WO2024/104238

PCT Pub. Date: May 23, 2024

(65) Prior Publication Data

US 2026/0012061 A1 Jan. 8, 2026

(30) Foreign Application Priority Data

Nov. 15, 2022 (CN) ........................ 202211428258.2

(51) Int. Cl.
*H02K 9/10* (2006.01)
*F25B 41/20* (2021.01)
(Continued)

(52) U.S. Cl.
CPC ............... *H02K 9/10* (2013.01); *F25B 41/20* (2021.01); *F25B 41/30* (2021.01); *F25B 41/40* (2021.01); *H02K 5/12* (2013.01); *H02K 9/19* (2013.01)

(58) Field of Classification Search
CPC .. H02K 9/10; H02K 5/12; H02K 9/19; H02K 5/207; F25B 41/20; F25B 41/30;
(Continued)

(56) References Cited

U.S. PATENT DOCUMENTS 7,704,056 B2 * 4/2010 Masoudipour ...... F04D 25/0606 62/505
2010/0071391 A1 * 3/2010 Lifson ....................... F25B 9/06 62/115
2016/0186764 A1 6/2016 Lissoni et al.

FOREIGN PATENT DOCUMENTS

CN 106655574 A * 5/2017 ............... H02K 9/04
CN 207975867 U 10/2018
(Continued)

OTHER PUBLICATIONS

CN-106655574-A_translate (Year: 2017).*
(Continued)

*Primary Examiner* — Tulsidas C Patel
*Assistant Examiner* — Mohammed Ahmed Qureshi
(74) *Attorney, Agent, or Firm* — NKL Law; Allen Xue

(57) ABSTRACT

In a magnetic levitation motor sealing-cooling apparatus for a refrigeration system motors of a first-stage compressor (1) and a second-stage compressor (2) are cooled by combining air cooling and water cooling. The cooling gas of second-
(Continued)

stage compressor (2) is taken from a working medium cooled at an outlet of the first-stage compressor (1). The cooling gas of the first-stage compressor (1) is taken from cooling gas at an outlet of a motor cavity of the second-stage compressor (2); and motor housings of the first-stage compressor (1) and the second-stage compressor (2) are provided with cooling water loops. The first-stage compressor (1), the second-stage compressor (2), and an expander (3) are separately provided with an impeller back sealing structure and a shaft sealing structure; and a part of the working medium at an outlet of the second-stage compressor (2) is led into the expander (3) to serve as sealing gas.

11 Claims, 5 Drawing Sheets

(51) Int. Cl.

| | |
|---|---|
| ***F25B 41/30*** | (2021.01) |
| ***F25B 41/40*** | (2021.01) |
| ***H02K 5/12*** | (2006.01) |
| ***H02K 9/19*** | (2006.01) |

(58) Field of Classification Search
CPC ...... F25B 41/40; F04D 29/284; F04D 29/058; F04D 17/10; F04D 25/06; F04D 25/16; F04D 29/102; F04D 29/5806
See application file for complete search history.

(56) References Cited

FOREIGN PATENT DOCUMENTS

| | | | |
|---|---|---|---|
| CN | 108895025 | A | 11/2018 |
| CN | 110455002 | A | 11/2019 |
| CN | 111322275 | A | 6/2020 |
| CN | 111441960 | A | 7/2020 |
| CN | 112096467 | A | 12/2020 |
| CN | 112583185 | A | 3/2021 |
| CN | 112833103 | A | 5/2021 |

OTHER PUBLICATIONS

Guo, Zhongwei et al., “Analysis of The Irreversible Air Refrigeration Cycle with Combination Offering of Cool and Heat”, Journal of Engineering Thermophysics, Sep. 30, 2004, vol. 25, No. S1, pp. 9-12.

* cited by examiner

MAGNETIC LEVITATION MOTOR SEALING-COOLING APPARATUS FOR REFRIGERATION SYSTEM AND METHOD THEREFOR

TECHNICAL FIELD

The present disclosure relates to the field of magnetic levitation motors, and in particular, to a magnetic levitation motor sealing-cooling apparatus for a refrigeration system and a method therefor.

BACKGROUND

A compressor and an expander are essential core components in a refrigeration system. The performance of the system can be effectively improved by using a magnetic levitation motor to drive the compressor-expander unit. The sealing and cooling modes of the magnetic levitation motor directly determine whether the motor can operate stably and safely. In the refrigeration system, the gas at a volute inlet of an expansion end can reach a temperature below −160° C. With no sealing treatment, the gas at the volute inlet will leak into the motor cavity through a gap between an impeller and a back plate, and the low-temperature medium will seriously threaten the safety of the magnetic levitation motor. Meanwhile, during the operation process of a high-power magnetic levitation motor, the heat generated by motor loss needs to be taken away through cooling, otherwise, the normal operation of the motor will also be influenced.

The existing sealing and cooling modes of the magnetic levitation motor, if applied to the refrigeration system, still have some technical barriers.

CN108895025A discloses a blower shaft end sealing, which is capable of balancing part of the axial force. The structure, in addition to its main function of balancing the axial force, can also play a good role in sealing the shaft end. However, the invention cannot completely solve the problem that the safety of the motor is threatened by the leakage of the low-temperature working medium. In addition, the impeller back of the impeller is designed in a stepped mode, which is likely to cause scraping when the impeller rotates at a high speed.

CN112583185A discloses a sealing structure for a magnetic levitation motor and a magnetic levitation motor. Through the structural sealing and introduction of nitrogen, positive pressure is generated, so as to form motor sealing. The introduced high-pressure nitrogen will form a countercurrent disturbance with the working medium in the volute, which may, to a certain extent, lower the aerodynamic performance of the fluid machine. In addition, the design of the sealing structure is complex and involves a great number of internal parts.

CN112833103A discloses a magnetic levitation sealing bearing, in which magnetic fluid is filled in the gap of the groove between the inner ring and the outer ring corresponding to the stator and rotor, such that the magnetic fluid is gathered in the groove through the magnetic pole interaction of the permanent magnets to form a sealing strip. The magnetic fluid-type sealing method disclosed by the invention has higher requirements on the magnetic fluid and the additionally arranged permanent magnets. If the method is used for sealing a low-temperature working medium, it will be difficult to ensure the sealing performance due to the influence of low temperature. In addition, the design of the third permanent magnet will, to a certain extent, influence the magnetic field of the magnetic levitation bearing, and the whole sealing structure is also complex.

CN112096467A discloses a cooling system and a cooling method for a magnetic levitation motor applied to an organic Rankine cycle. The working medium of the organic Rankine cycle unit is used to cool the magnetic levitation motor, improving the performance of the system and the power generation efficiency. The cooling mode completely depends on the working medium in the circulation system to cool the motor, leading to a large consumption of the cooling gas. If the cooling mode is applied to a refrigeration system, the large consumption of the refrigeration working medium will lower the refrigeration capacity of the system.

SUMMARY

To solve the above technical problems, the present disclosure provides a magnetic levitation motor sealing-cooling apparatus for a refrigeration system and a cooling method therefor, which facilitate matching the pressure of cooling gas, fully utilizing the cooling gas, and reducing the consumption of the cooling gas. In addition, through the sealing design, the low-temperature working medium at the expansion end is prevented from leaking into the motor, such that the stable and safe operation of the motor is fully ensured. Moreover, by combining air cooling with water cooling, the motor can be fully cooled.

The technical solutions adopted by the present disclosure are as follows:

Provided is a magnetic levitation motor sealing-cooling apparatus for a refrigeration system. The refrigeration system includes a magnetic levitation first-stage compressor, a magnetic levitation second-stage compressor, a magnetic levitation expander, a main heat exchanger, and a cooling gas regulating valve, the magnetic levitation first-stage compressor and the magnetic levitation expander are coaxially arranged, and the magnetic levitation first-stage compressor, the magnetic levitation second-stage compressor, the magnetic levitation expander, and the main heat exchanger are sequentially connected. Cooling gas in a magnetic levitation motor cavity of the magnetic levitation second-stage compressor is taken from a working medium cooled at an outlet of the magnetic levitation first-stage compressor; cooling gas of a magnetic levitation motor cavity of the magnetic levitation first-stage compressor is taken from cooling gas at an outlet of a magnetic levitation motor cavity of the magnetic levitation second-stage compressor, and by adjusting a flow rate and pressure through the cooling gas regulating valve, the pressure of the cooling gas is slightly lower than the pressure of a working medium at the impeller back of the magnetic levitation first-stage compressor. Further, the magnetic levitation motor sealing-cooling apparatus for a refrigeration system further includes a first aftercooler and a second aftercooler, and the first aftercooler and the second aftercooler are respectively disposed downstream of the magnetic levitation first-stage compressor and the magnetic levitation second-stage compressor for cooling the compressed working medium. Further, magnetic levitation motors of the magnetic levitation first-stage compressor and the magnetic levitation second-stage compressor are cooled by combining air cooling with water cooling; and magnetic levitation motor housings of the magnetic levitation first-stage compressor and the magnetic levitation second-stage compressor are provided with cooling water loops.

Further, cooling water, after flowing into the cooling water loop of the motor housing, flows along a circumferential direction and an axial direction of the motor housing.

Further, the magnetic levitation first-stage compressor, the magnetic levitation second-stage compressor, and the magnetic levitation expander are separately provided with an impeller back sealing structure and a shaft sealing structure.

Further, the impeller back sealing structure is disposed in a gap between an impeller and an impeller back and includes impeller sealing teeth and impeller back sealing teeth, the impeller sealing teeth and the impeller back sealing teeth forming a labyrinthine interlaced structure.

Further, the shaft sealing structure is disposed at a shaft end of the magnetic levitation motor and includes shaft end stator sealing teeth and shaft end rotor sealing teeth, the shaft end stator sealing teeth and the shaft end rotor sealing teeth forming a labyrinthine interlaced structure.

Further, short sealing teeth are further disposed between adjacent impeller back sealing teeth, and the short sealing teeth are arranged opposite to top ends of the impeller sealing teeth; and short sealing teeth are disposed between adjacent shaft end stator sealing teeth, and the short sealing teeth are arranged opposite to top ends of the shaft end rotor sealing teeth.

Further, a part of a working medium cooled at an outlet of the magnetic levitation second-stage compressor is led into the magnetic levitation expander through a sealing gas regulating valve to serve as sealing gas, and a sealing gas through hole is formed in a shaft end of the magnetic levitation expander for introducing the sealing gas. The pressure and flow rate of the sealing gas are adjusted through the sealing gas regulating valve, such that the pressure of the sealing gas is adjusted to be equal to the pressure at the impeller back of the expander.

Further, a first cooler is disposed downstream of the outlet of the magnetic levitation motor cavity of the levitation second-stage compressor; a part of cooling gas cooled by the second cooler is led into the magnetic levitation motor cavity of the magnetic levitation first-stage compressor, and the remaining part of the cooling gas is led into the upstream conduits of the working medium inlet of the magnetic levitation first-stage compressor.

Further, a second cooler is disposed downstream of the outlet of the magnetic levitation motor cavity of the magnetic levitation first-stage compressor, and cooling gas cooled by the second cooler is led into the upstream conduits of the working medium inlet of the magnetic levitation first-stage compressor through conduits.

Provided is a cooling method for a magnetic levitation motor sealing-cooling apparatus for a refrigeration system. A part of a working medium cooled at an outlet of a magnetic levitation first-stage compressor is led, as cooling gas, into a magnetic levitation motor cavity of a magnetic levitation second-stage compressor through conduits for cooling a magnetic levitation motor of the magnetic levitation second-stage compressor; a part of cooling gas downstream of an outlet of a magnetic levitation motor cavity of the magnetic levitation second-stage compressor is led into a magnetic levitation motor cavity of the magnetic levitation first-stage compressor for cooling a magnetic levitation motor of the magnetic levitation first-stage compressor, and the remaining part of the cooling gas is led into upstream conduits of a working medium inlet of the magnetic levitation first-stage compressor and re-enters the magnetic levitation first-stage compressor for circulation; and cooling gas downstream of an outlet of the magnetic levitation motor cavity of the magnetic levitation first-stage compressor is led into the upstream conduits of the working medium inlet of the magnetic levitation first-stage compressor and re-enters the magnetic levitation first-stage compressor for circulation.

The beneficial effects of the present disclosure are as follows:

A part of the working medium cooled at the outlet of the magnetic levitation first-stage compressor is led, as the cooling gas, into the magnetic levitation motor cavity of the magnetic levitation second-stage compressor, and a part of the cooling gas downstream of the outlet of the magnetic levitation motor cavity of the magnetic levitation second-stage compressor is led into the magnetic levitation motor cavity of the magnetic levitation first-stage compressor, thereby facilitating matching the pressure of the cooling gas, fully utilizing the cooling gas, and thus reducing the consumption of the cooling gas.

The motor adopts the design of combining air cooling with water cooling. The heat generated at a motor rotor is fully taken away through air cooling, and the heat of a motor stator is fully taken away through the design of water cooling loops. On the premise of ensuring the stable operation of the motor, the consumption of cooling gas is effectively reduced, that is, the extra consumption of the refrigeration working medium of the system is effectively reduced, such that the refrigeration capacity of the system is ensured.

Through the design of sealing and cooling, the fit of the temperature and pressure of the sealing gas and cooling gas is achieved. The sealing and cooling are complementary to each other and inseparable from each other, forming a collaborative sealing-cooling solution for the motor.

The combination of impeller back sealing and shaft sealing, and the interlaced design of the sealing structure greatly reduce the leakage amount of the working medium at the impeller backs of the first-stage compressor and the second-stage compressor, such that the refrigeration capacity of the system is ensured.

In the sealing design of the expander, through the introduction of hot sealing gas, a balanced pressure field of the working medium and the sealing gas at the impeller back is established, such that the low-temperature working medium at the impeller back is prevented from entering the motor cavity, and the flowing of the hot sealing gas between the sealing structure and the motor cavity has no unfavorable effect on the operation of the motor, such that the safe and stable operation of the motor is effectively ensured.

In the process flow of the refrigeration system, through the design of sealing and cooling, the fit of the temperature and pressure of the sealing gas and cooling gas is achieved. The sealing and cooling are complementary to each other, forming a collaborative sealing-cooling solution for the motor.

BRIEF DESCRIPTION OF THE DRAWINGS

To more clearly illustrate the technical solutions in the embodiments of the present disclosure or in the prior art, the drawings required to be used in the description of the embodiments or the prior art are briefly introduced below. It is obvious that the drawings in the description below are some embodiments of the present disclosure, and those of ordinary skill in the art can obtain other drawings according to these drawings without creative efforts.

DESCRIPTION OF EMBODIMENTS

Implementations

The technical solutions in the present disclosure will be clearly and completely described below with reference to the drawings in the embodiments of the present disclosure, and it is obvious that the described embodiments are only a part of the embodiments of the present disclosure but not all of them. Based on the embodiments of the present disclosure, all other embodiments obtained by those of ordinary skill in the art without creative efforts shall fall within the protection scope of the present disclosure.

First Embodiment

Figure 1:
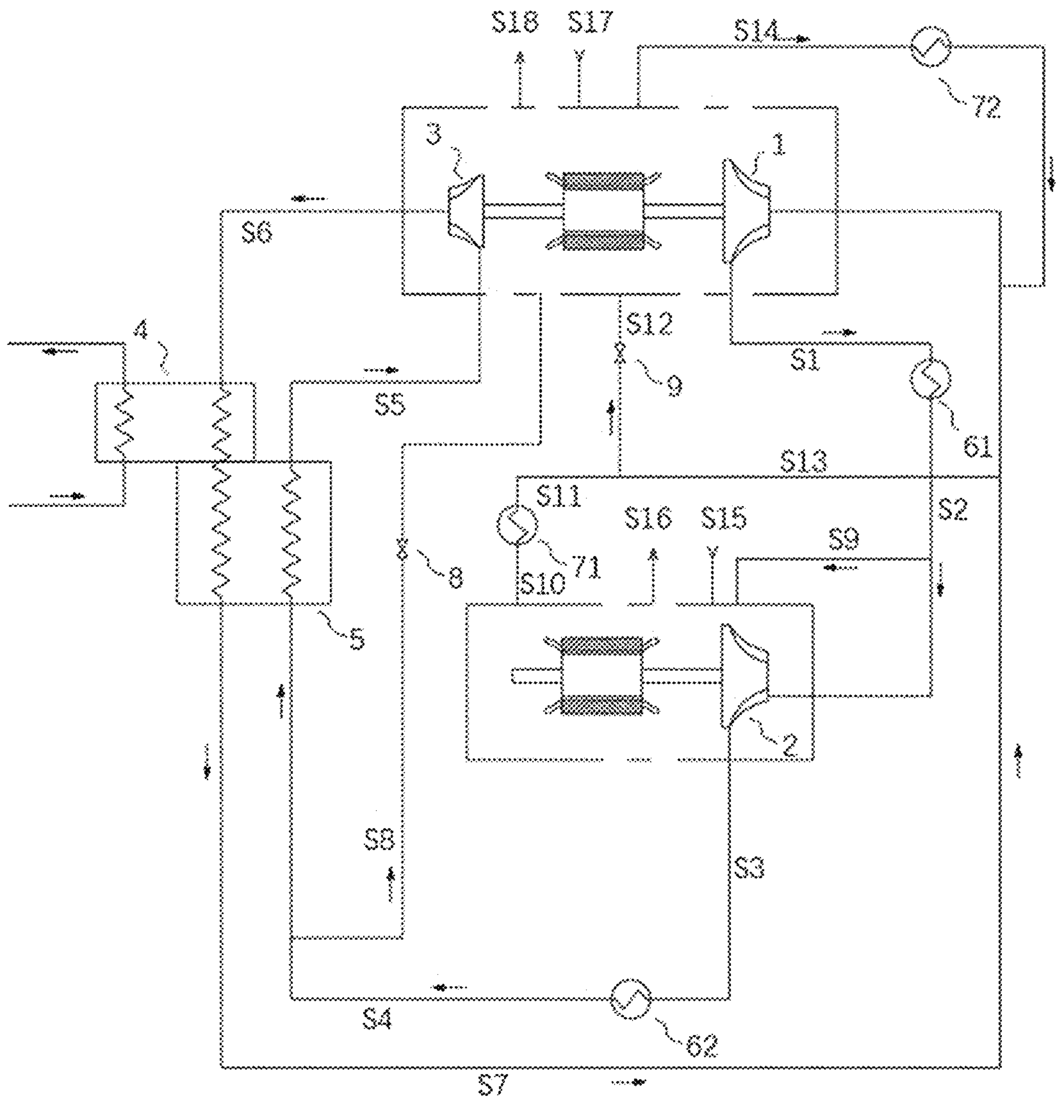
FIG. 1 is a flowchart of an overall process of a refrigeration system.

Provided is a magnetic levitation motor sealing-cooling apparatus for a refrigeration system according to the present disclosure. As shown in FIG. 1, the refrigeration system includes a magnetic levitation first-stage compressor 1, a magnetic levitation second-stage compressor 2, a magnetic levitation expander 3, a main heat exchanger 4, a heat regenerator 5, a first aftercooler 61, a second aftercooler 62, a first cooler 71, a second cooler 72, a sealing gas regulating valve 8, and a cooling gas regulating valve 9. The magnetic levitation first-stage compressor 1 and the magnetic levitation expander 3 are coaxially arranged, and the magnetic levitation first-stage compressor 1, the magnetic levitation second-stage compressor 2, the heat regenerator 5, the magnetic levitation expander 3, and the main heat exchanger 4 are sequentially connected. A working medium outlet of the magnetic levitation first-stage compressor 1 is connected to a working medium inlet of the magnetic levitation second-stage compressor 2 through a first working medium conduit S1, the first aftercooler 61, and a second working medium conduit S2 in sequence. A working medium outlet of the magnetic levitation second-stage compressor 2 is connected to a working medium inlet of the magnetic levitation expander 3 through a third working medium conduit S3, the second aftercooler 62, a fourth working medium conduit S4, the heat regenerator 5, and a fifth working medium conduit S5 in sequence. A working medium outlet of the magnetic levitation expander 3 is connected to a working medium inlet of the magnetic levitation first-stage compressor 1 through a sixth working medium conduit S6, the main heat exchanger 4, and a seventh working medium conduit S7 in sequence.

The refrigeration system may adopt closed-loop circulation. The specific process is as follows: The refrigeration working medium enters the magnetic levitation first-stage compressor 1 to be compressed, and the first aftercooler 61 cools the working medium at the outlet of the compressor; the cooled working medium enters the second-stage compressor 2 to be compressed and then cooled by the second aftercooler 62, then the cooled working medium enters the heat regenerator 5 to be pre-cooled, and then the working medium enters the magnetic levitation expander 3 to be expanded and do work, such that some power is recycled. The expanded working medium enters the main heat exchanger 4 to provide cold energy to the outside; the working medium, after passing through the main heat exchanger 4, still has some cold energy, and then enters the heat regenerator 5 to pre-cool the working medium compressed by the second-stage compressor 2; and then the working medium at the outlet of the heat regenerator enters the first-stage compressor to complete closed-loop circulation.

Figure 2:
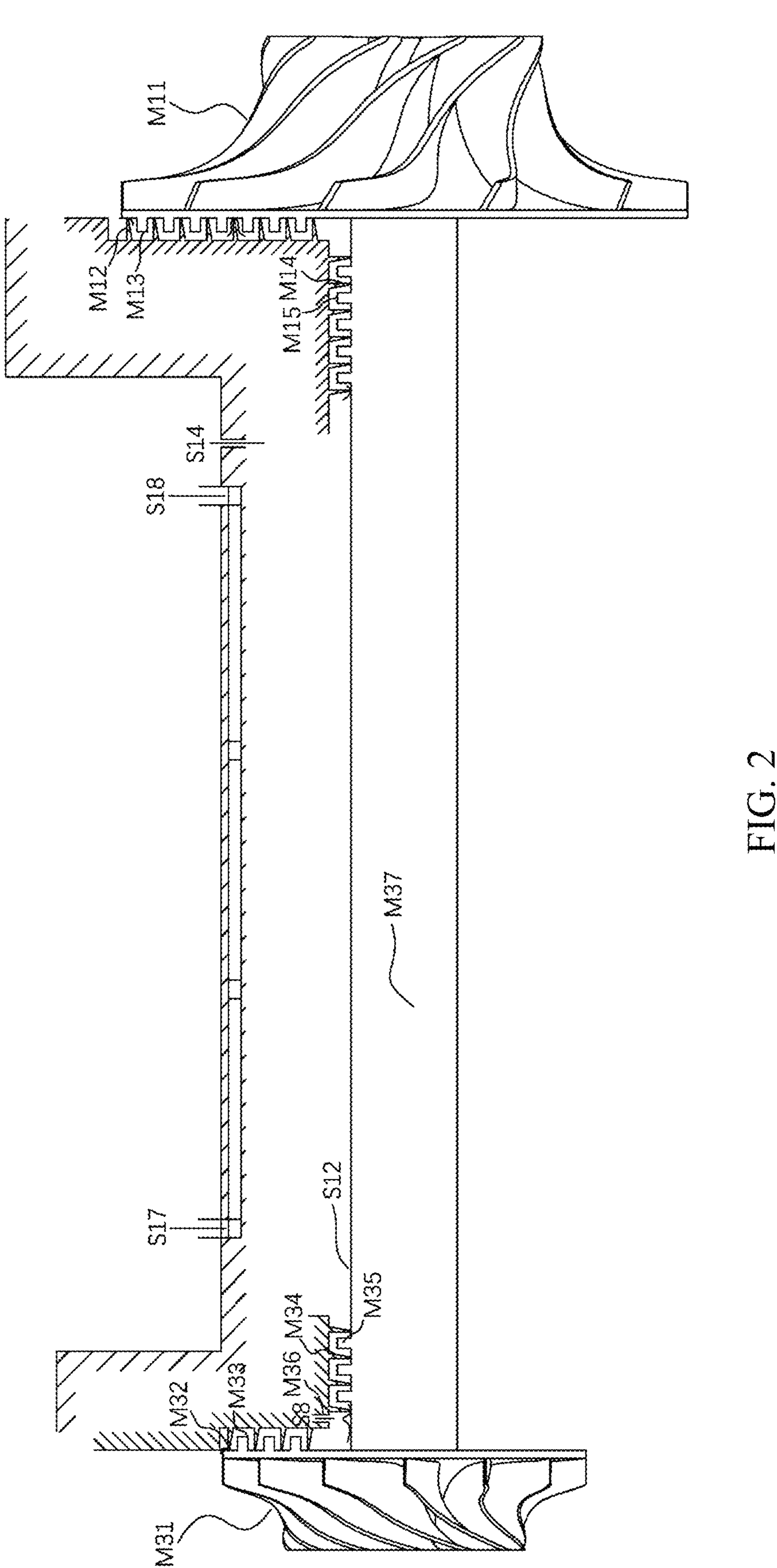
FIG. 2 is a schematic diagram of a collaborative sealing-cooling solution for a magnetic levitation first-stage compressor and a magnetic levitation expander.
Figure 3:
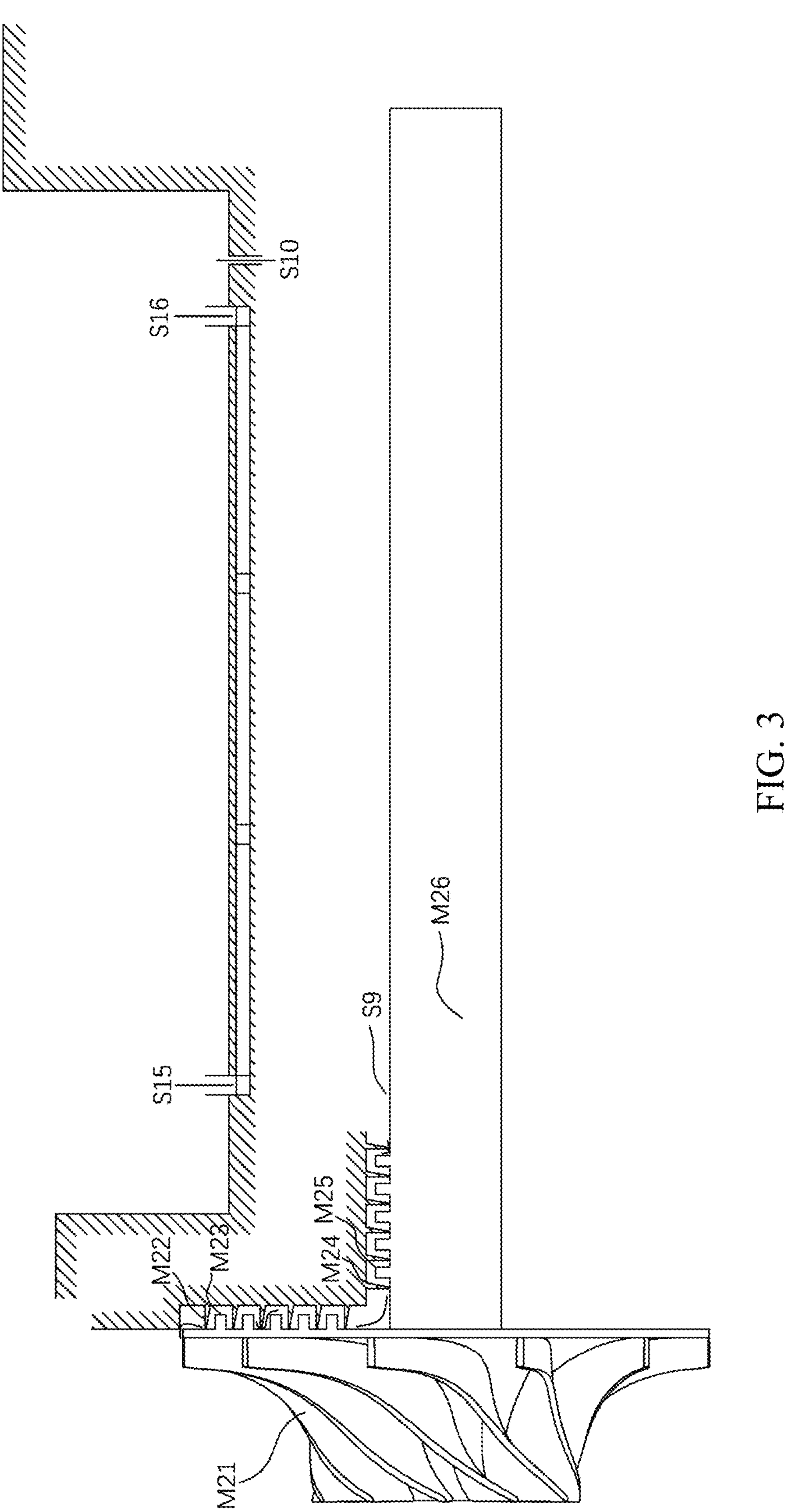
FIG. 3 is a schematic diagram of a collaborative sealing-cooling solution for a magnetic levitation second-stage compressor.

As the guarantee of the stable operation of the magnetic levitation motor, the sealing and cooling modes of the magnetic levitation motor play a crucial role. From FIGS. 2 and 3, it can be seen that the magnetic levitation motor cavities of the magnetic levitation first-stage compressor 1 and the magnetic levitation second-stage compressor 2 are filled with cooling gas. To prevent the cooling gas from flowing back toward the impeller back of the impeller, the pressure of the cooling gas needs to be lower than the pressure of the working medium at the impeller back of the impeller.

The cooling gas in the magnetic levitation motor cavity of the magnetic levitation second-stage compressor 2 is taken from the working medium cooled at the outlet of the first-stage compressor. A cooling gas inlet of the magnetic levitation motor cavity of the magnetic levitation second-stage compressor 2 is connected to the second working medium conduit S2 through a ninth working medium conduit S9 and configured to lead the working medium cooled at the outlet of the first-stage compressor into the magnetic levitation motor cavity of the magnetic levitation second-stage compressor 2. A cooling gas outlet of the magnetic levitation motor cavity of the magnetic levitation second-stage compressor 2 is connected to the seventh working medium conduit S7 through a tenth working medium conduit S10, the first cooler 71, an eleventh working medium conduit S11, and a thirteenth working medium conduit S13. A cooling gas inlet of the magnetic levitation motor cavity of the magnetic levitation first-stage compressor 1 is connected between the eleventh working medium conduit S11 and the thirteenth working medium conduit S13 through a twelfth working medium conduit S12 and the cooling gas regulating valve 9. A cooling gas outlet of the magnetic levitation motor cavity of the magnetic levitation first-stage compressor 1 is connected to the seventh working medium conduit S7 through a fourteenth working medium conduit S14 and the second cooler 72. A sealing gas inlet of the magnetic levitation motor cavity of the magnetic levitation first-stage compressor 1 is connected to the fourth working medium conduit S4 through an eighth working medium conduit S8 and the sealing gas regulating valve 8.

Through the introduction mode of the cooling gas described above, the pressure of the cooling gas in the magnetic levitation motor cavities of the magnetic levitation first-stage compressor 1 and the magnetic levitation second-stage compressor 2 can be lower than the pressure of the working medium at the impeller back of the impeller, thus effectively preventing the cooling gas from flowing back toward the impeller back of the impeller.

Second Embodiment

On the basis of the first embodiment, magnetic levitation motor housings of the magnetic levitation first-stage compressor 1 and the magnetic levitation second-stage compressor 2 are further provided with cooling water loops. The cooling water cools the magnetic levitation motors through the cooling water loops of the motor housings.

Figure 4:
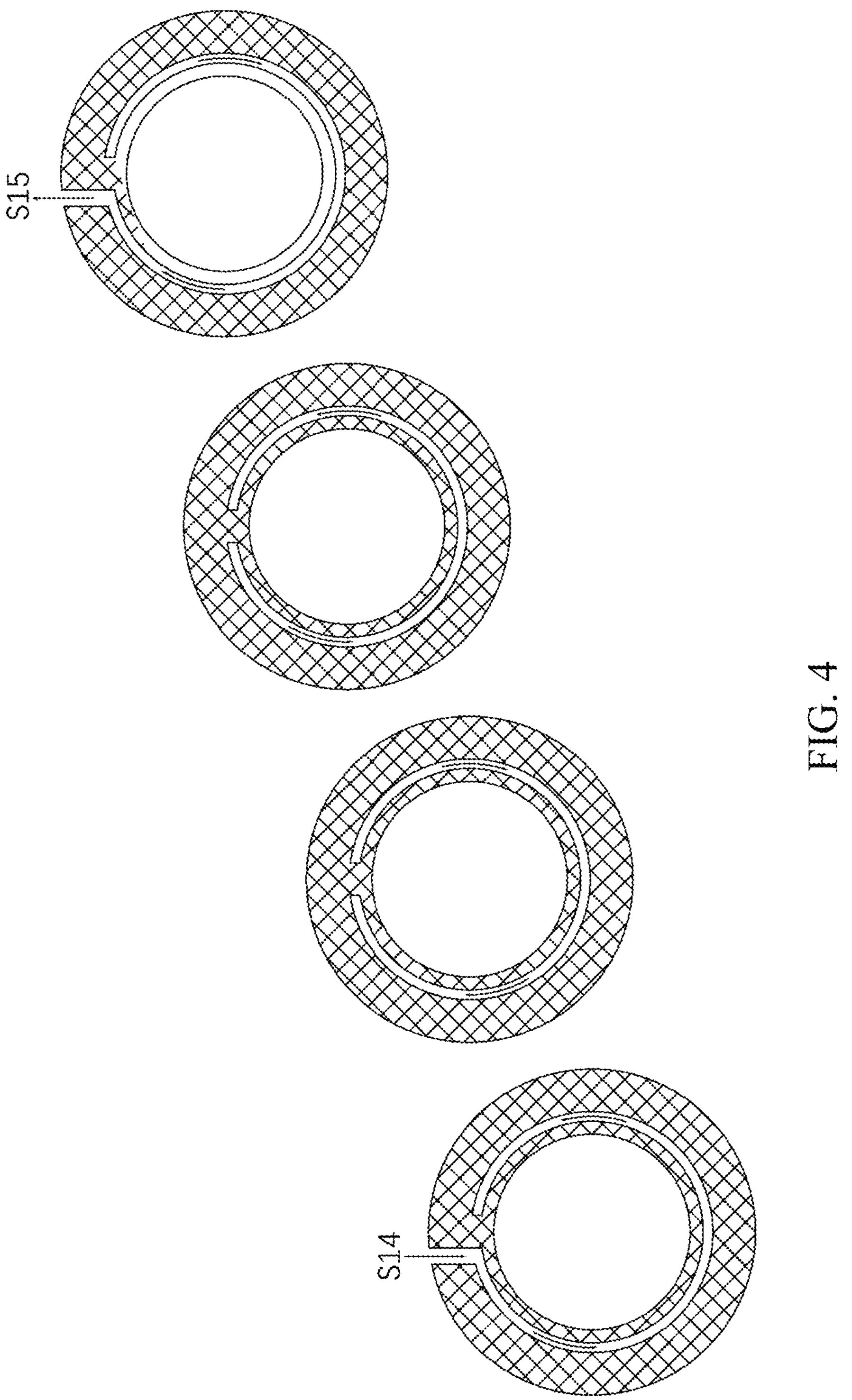
FIG. 4 is a schematic diagram of cooling water loops.

The specific cooling water loops of the motor housings are shown in FIG. 4.

Specifically, the cooling mode of the motor of the magnetic levitation second-stage compressor 2 is as follows: The working medium at the outlet of the first-stage compressor 1 is cooled by the first aftercooler 61 (preferably, the after-cooling temperature may be set to be about 39° C., as adjusted according to the temperature of the cooling water actually supplied), and then enters the motor cavity of the magnetic levitation second-stage compressor 2 through the ninth working medium conduit S9 and takes away the heat generated by the operation of the motor rotor. Meanwhile, the cooling water flows into the cooling water loop of the motor housing through the first cooling water conduit S15, and then flows along the circumferential direction and the axial direction of the motor housing. Through the cooling water loop, the heat of the motor stator is fully taken away, and the cooling water is discharged from the conduit at the motor housing through the second cooling water outlet conduit S16. By combining water cooling with air cooling, the consumption of the flow rate of the refrigeration working medium is greatly reduced while the cooling requirement of the motor is met, such that the refrigeration capacity of the system is ensured. In the water cooling design, through the design of the cooling water loop, the circulation range of the cooling water loop is widened, and the cooling capacity for the motor is enhanced.

The cooling mode of the magnetic levitation first-stage compressor 1 is as follows: The cooler at the cooling gas outlet of the magnetic levitation second-stage compressor 2 is cooled by the first cooler 71, and then led into the motor cavity of the magnetic levitation first-stage compressor 1 through the twelfth working medium conduit S12 to serve as cooling gas. To prevent the cooling gas from flowing back toward the impeller back of the impeller of the first-stage compressor, the flow rate and pressure of the cooling gas in the twelfth working medium conduit S12 are adjusted through the cooling gas regulating valve 9 to enable the pressure to be slightly lower than the pressure of the working medium at the impeller back of the magnetic levitation first-stage compressor 1, and then the cooling gas flows into the motor cavity of the magnetic levitation compressor 1. In addition, excess cooling gas may be led out into the seventh working medium conduit S7 through the thirteenth working medium conduit S13. The cooling gas entering the motor cavity of the magnetic levitation first-stage compressor 1, after fully cooling the motor rotor M37, is discharged via the motor housing. The cooling gas with the heat of the motor, after being cooled by the fourteenth working medium conduit S14 and the second cooler 72, flows into the seventh working medium conduit S7 again to enter the magnetic levitation first-stage compressor 1 for circulation. The water cooling mode of the magnetic levitation first-stage compressor 1 is the same as that of the magnetic levitation second-stage compressor 2, and will not be described in detail herein.

Third Embodiment

To further prevent the cooling gas from flowing back toward the impeller back of the impeller, corresponding seals may be arranged for the magnetic levitation first-stage compressor 1 and the magnetic levitation second-stage compressor 2. The specific sealing modes are as follows: The sealing mode of the magnetic levitation second-stage compressor 2 is as follows: in the gap between the impeller M21 and the impeller back of the second-stage compressor, impeller sealing teeth M23 and impeller back sealing teeth M22 are provided, and the impeller sealing teeth and the impeller back sealing teeth form a labyrinthine interlaced structure; and at the shaft end, shaft end stator sealing teeth M24 and shaft end rotor sealing teeth M25 are provided, and the shaft end stator sealing teeth and the shaft end rotor sealing teeth form a labyrinthine interlaced structure. Due to the pressure difference between the working medium at the outlet of the impeller M21 and the cooling gas in the motor cavity, a small amount of leakage will occur at the impeller back of the impeller. With the designs of two labyrinthine interlaced structures at the impeller back and the shaft end, and the flow dead zone formed between the two sealing structures, the leakage amount of the working medium will be greatly reduced, such that the refrigeration capacity of the system is ensured. In addition, the small amount of leaked working medium will combine with the cooling gas in the motor cavity and then be discharged as one flow through the tenth working medium conduit S10.

The sealing mode of the magnetic levitation first-stage compressor 1 is similar to that of the magnetic levitation second-stage compressor 2. Due to the pressure difference between the working medium at the impeller back of the impeller of the first-stage compressor and the cooling gas in the motor cavity of the integrated machine, a small amount of leakage will occur. With the designs of labyrinthine interlaced structures at the impeller back and the shaft end, and the flow dead zone formed between the two sealing structures, the leakage amount of the working medium will be greatly reduced, and the consumption of circulating working medium in the system is reduced, such that the refrigeration capacity of the system is ensured. In addition, the small amount of leaked working medium will be discharged through the fourteenth working medium conduit S14.

Figure 5:
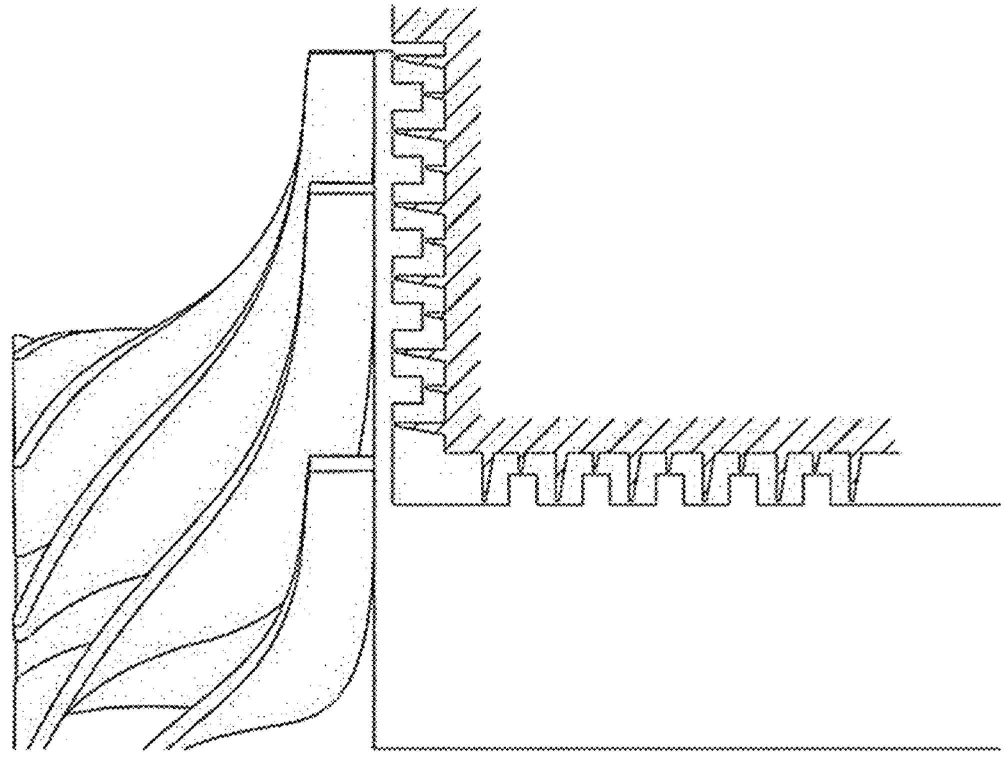
FIG. 5 is a schematic diagram of a sealing structure according to another embodiment.

Another implementation of the impeller back sealing structure and the shaft end sealing structure of the magnetic levitation first-stage compressor 1, the magnetic levitation second-stage compressor 2, and the magnetic levitation expander 3 is shown in FIG. 5. Short sealing teeth are disposed between adjacent impeller back sealing teeth, and the short sealing teeth are arranged opposite to the top ends of the impeller sealing teeth; and short sealing teeth are disposed between adjacent shaft end stator sealing teeth, and the short sealing teeth are arranged opposite to the top ends of the shaft end rotor sealing teeth.

Fourth Embodiment

To further improve the sealing effect, corresponding sealing measures can be adopted for the magnetic levitation expander 3. The specific sealing mode is as follows: The working medium at the outlet of the magnetic levitation second-stage compressor 2 is cooled by the second aftercooler 62 (preferably, the after-cooling temperature may be set to be about 39° C., as adjusted according to the temperature of the cooling water actually supplied), and then led through the eighth working medium conduit to serve as the sealing gas of the magnetic levitation expander 3. To prevent the sealing gas from flowing back toward the impeller back of the impeller M31 of the expander, the pressure and flow rate of the sealing gas are adjusted through the sealing gas regulating valve 8. At the impeller back of the magnetic levitation expander 3, impeller back sealing teeth M32 and impeller sealing teeth M33 are provided, and the impeller back sealing teeth and the impeller sealing teeth form a labyrinthine interlaced structure; and at the shaft end of the magnetic levitation expander 3, shaft end stator sealing teeth M34 and shaft end rotor sealing teeth M35 are provided, and the shaft end stator sealing teeth and the shaft end rotor sealing teeth form a labyrinthine interlaced structure. To prevent the low-temperature working medium at the impeller back of the expander from leaking into the motor cavity, a sealing gas through hole M36 is formed in the shaft end for introducing the sealing gas. The pressure of the sealing gas is adjusted to be equal to the pressure at the impeller back through the sealing gas regulating valve. The dynamic pressure formed by the rotation of the working medium at the impeller back along with the impeller will be consumed by the flow dead zone between the impeller back sealing and the shaft end sealing. In this way, a balanced pressure field will be established for the working medium and the sealing gas at the gap inlet of the impeller back of the expander, such that the low-temperature working medium at the impeller back is prevented from leaking into the motor cavity and threatening the operation safety of the motor. Meanwhile, due to the pressure difference between the sealing gas and the cooling gas in the motor cavity, a small amount of leakage will occur. Through the design of the interlaced sealing teeth at the shaft end, the leakage amount at the position will be greatly reduced, and the temperature of the sealing gas may not influence the safe operation of the motor.

The embodiments described above are merely preferred embodiments of the present disclosure, and it should be understood that the preferred embodiments of the present disclosure disclosed herein are illustrative of the principles of the embodiments of the present disclosure and are not to limit the present disclosure. All the equivalent structural changes made by using the content of the specification and the drawings of the present disclosure, or the direct/indirect application of the content to other related technical fields, under the inventive concept of the present disclosure, are included in the patent protection scope of the present disclosure.

The invention claimed is:

1. A cooling method for a magnetic levitation motor sealing-cooling apparatus for a refrigeration system that comprises a magnetic levitation first-stage compressor, a magnetic levitation second-stage compressor, a magnetic levitation expander, a main heat exchanger, and a cooling gas regulating valve, the magnetic levitation first-stage compressor and the magnetic levitation expander being coaxially arranged, and the magnetic levitation first-stage compressor, the magnetic levitation second-stage compressor, the magnetic levitation expander, and the main heat exchanger being sequentially connected, wherein cooling gas in a magnetic levitation motor cavity of the magnetic levitation second-stage compressor is taken from a working medium cooled at an outlet of the magnetic levitation first-stage compressor; cooling gas of a magnetic levitation motor cavity of the magnetic levitation first-stage compressor is taken from cooling gas at an outlet of the magnetic levitation motor cavity of the magnetic levitation second-stage compressor, and by adjusting a flow rate and pressure through the cooling gas regulating valve, a part of the working medium cooled at the outlet of the magnetic levitation first-stage compressor is led, as cooling gas, into the magnetic levitation motor cavity of the magnetic levitation second-stage compressor through conduits for cooling a magnetic levitation motor of the magnetic levitation second-stage compressor; a part of cooling gas downstream of the outlet of the magnetic levitation motor cavity of the magnetic levitation second-stage compressor is led into the magnetic levitation motor cavity of the magnetic levitation first-stage compressor for cooling a magnetic levitation motor of the magnetic levitation first-stage compressor, and the remaining part of the cooling gas is led into upstream conduits of a working medium inlet of the magnetic levitation first-stage compressor and re-enters the magnetic levitation first-stage compressor for circulation; and cooling gas downstream of an outlet of the magnetic levitation motor cavity of the magnetic levitation first-stage compressor is led into the upstream conduits of the working medium inlet of the magnetic levitation first-stage compressor and re-enters the magnetic levitation first-stage compressor for circulation.

2. The cooling method according to claim 1, further comprising a first aftercooler and a second aftercooler, wherein the first aftercooler and the second aftercooler are respectively disposed downstream of the magnetic levitation first-stage compressor and the magnetic levitation second-stage compressor.

3. The cooling method according to claim 1, wherein magnetic levitation motor housings of the magnetic levitation first-stage compressor and the magnetic levitation second-stage compressor are provided with cooling water loops.

4. The cooling method according to claim 3, wherein cooling water, after flowing into the cooling water loop of the motor housing, flows along a circumferential direction and an axial direction of the motor housing.

5. The cooling method according to claim 1, wherein the magnetic levitation first-stage compressor, the magnetic levitation second-stage compressor, and the magnetic levitation expander are separately provided with an impeller back sealing structure and a shaft sealing structure.

6. The cooling method according to claim 5, wherein the impeller back sealing structure is disposed in a gap between an impeller and an impeller back and comprises impeller sealing teeth and impeller back sealing teeth, the impeller sealing teeth and the impeller back sealing teeth forming a labyrinthine interlaced structure.

7. The cooling method according to claim 6, wherein the shaft sealing structure is disposed at a shaft end of the magnetic levitation motor and comprises shaft end stator sealing teeth and shaft end rotor sealing teeth, the shaft end stator sealing teeth and the shaft end rotor sealing teeth forming a labyrinthine interlaced structure.

8. The cooling method according to claim 7, wherein short sealing teeth are further disposed between adjacent impeller back sealing teeth, and the short sealing teeth are arranged opposite to top ends of the impeller sealing teeth; and short sealing teeth are disposed between adjacent shaft end stator sealing teeth, and the short sealing teeth are arranged opposite to top ends of the shaft end rotor sealing teeth.

9. The cooling method according to claim 1, wherein a part of a working medium cooled at an outlet of the magnetic levitation second-stage compressor is led into the magnetic levitation expander through a sealing gas regulating valve to serve as sealing gas, and a sealing gas through hole is formed in a shaft end of the magnetic levitation expander for introducing the sealing gas.

10. The cooling method according to claim 1, wherein a first cooler is disposed downstream of the outlet of the magnetic levitation motor cavity of the magnetic levitation second-stage compressor; a part of cooling gas cooled by a second cooler is led into the magnetic levitation motor cavity of the magnetic levitation first-stage compressor, and the remaining part of the cooling gas is led into the upstream conduits of the working medium inlet of the magnetic levitation first-stage compressor.

11. The cooling method according to claim 10, wherein a second cooler is disposed downstream of the outlet of the magnetic levitation motor cavity of the magnetic levitation first-stage compressor, and cooling gas cooled by the second cooler is led into the upstream conduits of the working medium inlet of the magnetic levitation first-stage compressor through conduits.

* * * * *